Oct. 30, 1956  E. J. FREY  2,768,789
MIXING VALVE

Filed May 5, 1953  5 Sheets-Sheet 1

INVENTOR.
Edward J. Frey
BY
His Attorney

Oct. 30, 1956    E. J. FREY    2,768,789
MIXING VALVE

Filed May 5, 1953    5 Sheets-Sheet 2

INVENTOR.
Edward J. Frey
BY
His Attorney

Oct. 30, 1956     E. J. FREY     2,768,789
MIXING VALVE
Filed May 5, 1953     5 Sheets-Sheet 3
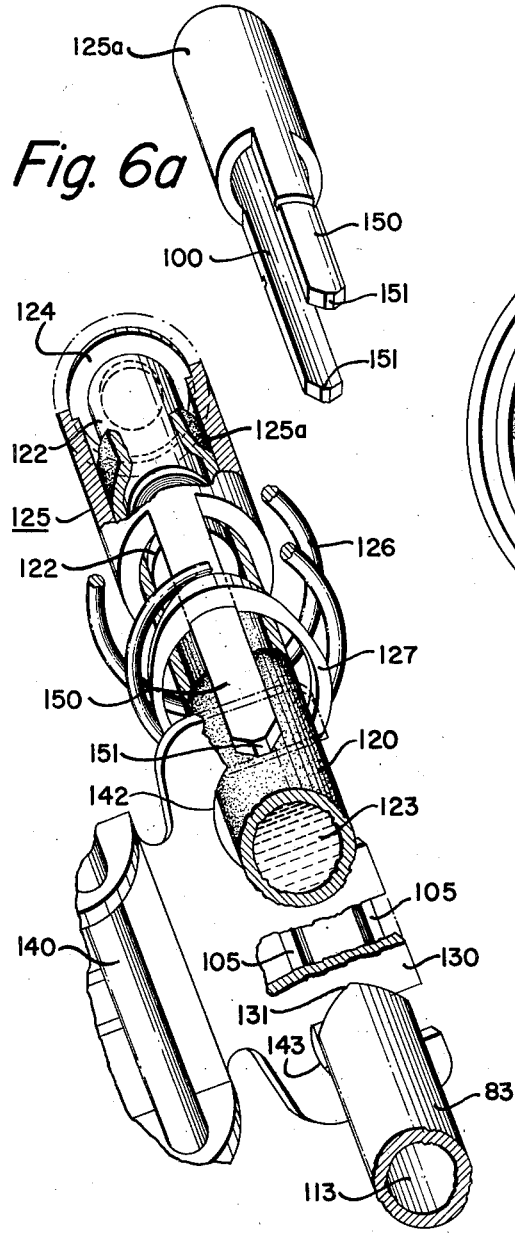
Fig. 6a
Fig. 6
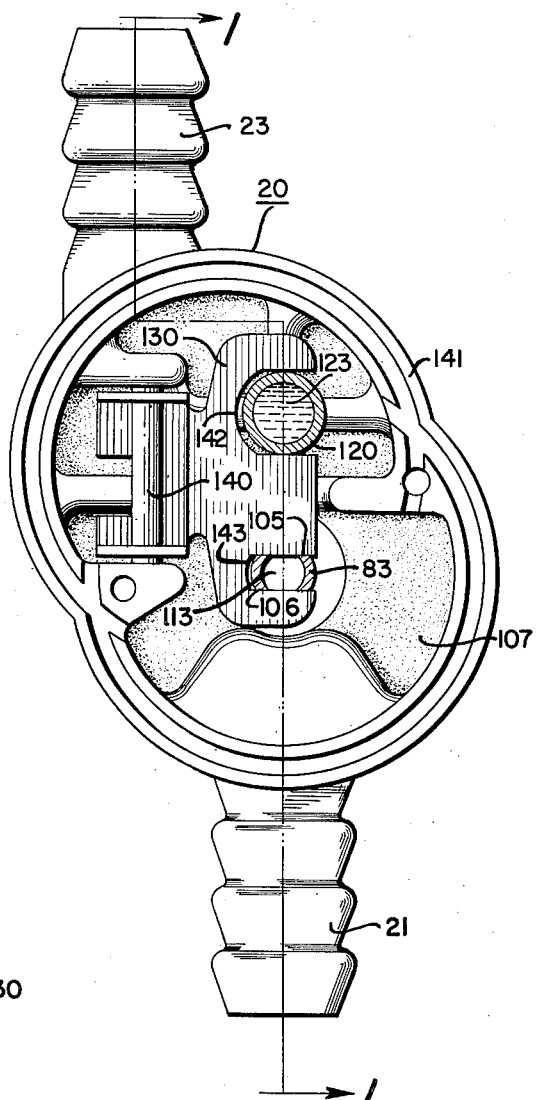
Fig. 5
INVENTOR.
Edward J. Frey
BY
His Attorney INVENTOR.
Edward J. Frey

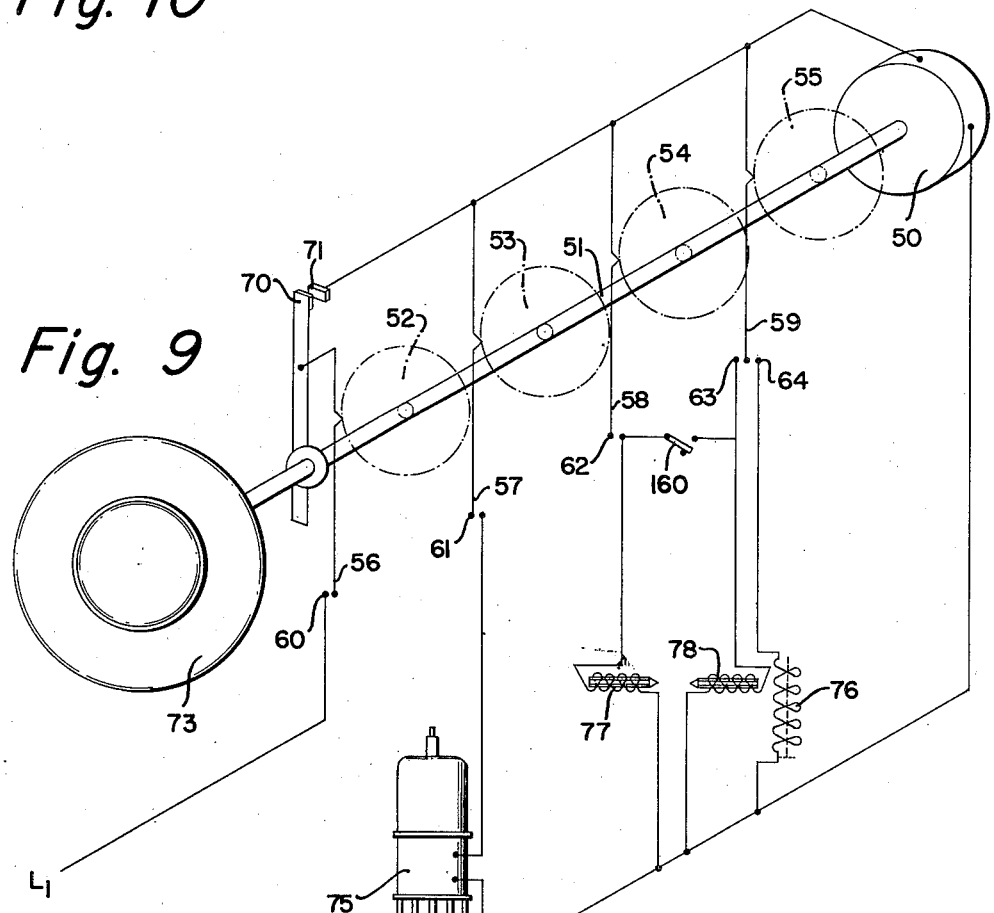

United States Patent Office 2,768,789
Patented Oct. 30, 1956

2,768,789

MIXING VALVE

Edward J. Frey, Dayton, Ohio, assignor to General Motors Corporation, Detroit, Mich., a corporation of Delaware Application May 5, 1953, Serial No. 353,061

11 Claims. (Cl. 236—12)

This invention relates to domestic appliances and more particularly to thermostatic mixers for washing machines, or the like.

This application is a continuation-in-part of my co-pending application S. N. 321,258, filed November 18, 1952, for Domestic Appliance.

An object of this invention is to provide a fluid mixer of the pilot operated valve type, which utilizes the pressure of one of the fluids for placing the valve in a position to allow free flow of the other fluid.

Another object of this invention is to provide a fluid mixer in which the thermostat is allowed to respond to the temperature of one of the fluids independently of the position of a metering device.

Another object of this invention is to provide a fluid mixing valve which provides free flow of one of the fluids without by-passing the thermostatic control.

Another object of this invention is to provide a fluid mixer having a pilot operated valve having means aiding in reducing the pressure in the pilot chamber to provide a stronger action for actuating a metering device or the like.

Further objects and advantages of the present invention will be apparent from the following description, reference being had to the accompanying drawings wherein a preferred form of the invention is clearly shown.

In the drawings:

Figure 5 is an enlarged cross-section taken along the line 5—5 of Figure 1.

Figure 6 is a perspective with parts broken away of a portion of the thermostat.

Figure 6a is a perspective of "cylinder" 125.

Figure 9 is a view similar to Figure 7 showing a slightly modified arrangement.

Figure 10 is a chart showing a sequence of operations for the device indicated in Figure 9.

Figures 7, 8:
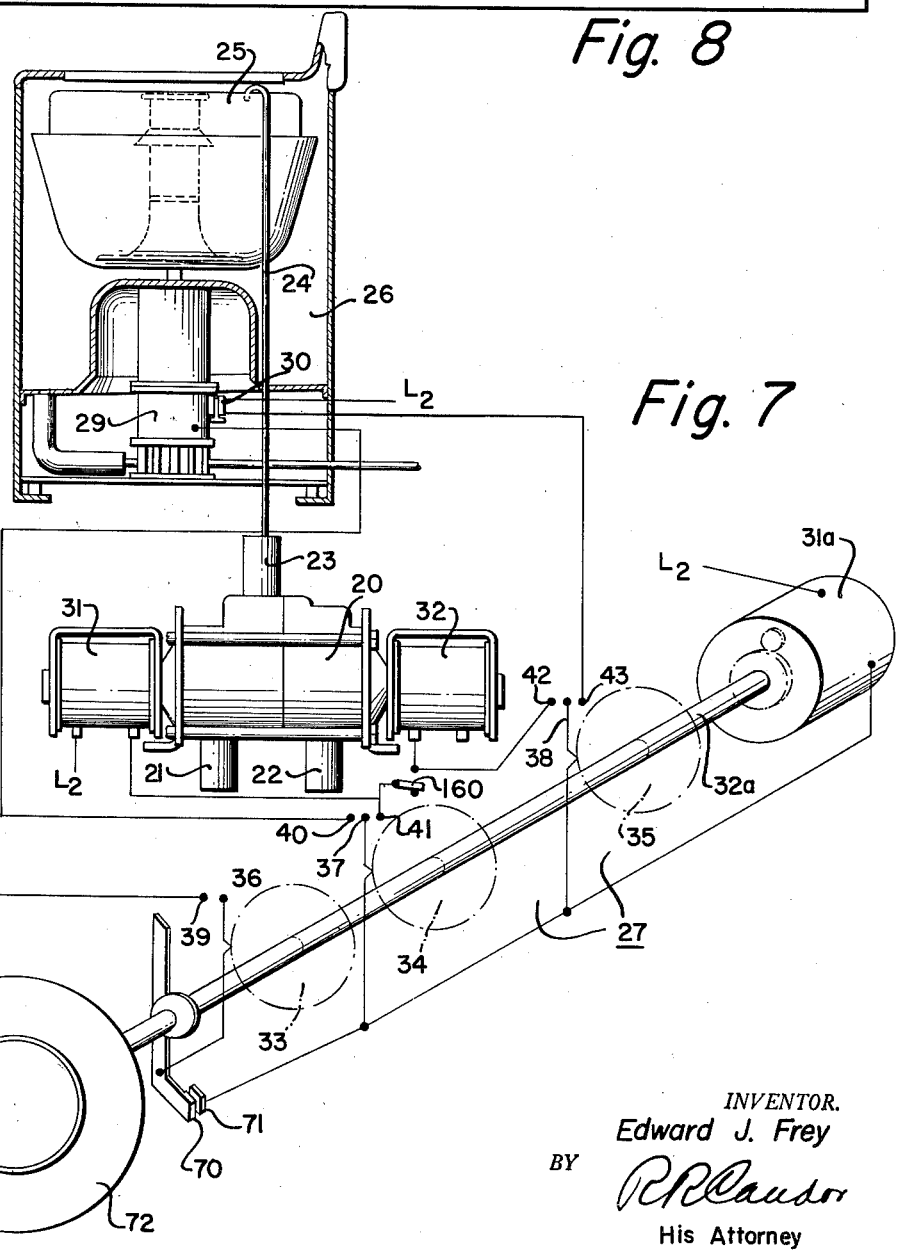
Figure 7 is a diagrammatic representation of the mixer in combination with a timer and a washing machine.
Figure 8 is a chart indicating a sequence of operations for the apparatus shown in Figure 7.

Referring first to Figure 7, the mixer 20 is adapted to receive hot water at the hot fluid inlet 21 and cold water at the cold fluid inlet 22 and discharge the fluid received from one or both of said inlets through the fluid outlet 23 and from thence through the pipe 24 into the tub 25 of the washing machine 26. A timer 27 supplies current to the washing machine motor 29, spin-agitation solenoid 30, hot water solenoid 31, and cold water solenoid 32. The timer is operated by timer motor 31a which produces a step-by-step rotation of the shaft 32a to actuate cams 33, 34 and 35 for simultaneously or sequentially closing movable contacts 36, 37 and 38 to and away from stationary contacts 39, 40, 41, 42 and 43. The operation of the structure diagrammatically indicated in Figure 7 may follow the sequences indicated in Figure 8 to produce a complete washing operation, which will be more fully hereinafter described.

Referring to Figure 9, which in general refers to a mechanism similar to that indicated in Figure 7, the timer motor 50 produces a step-by-step rotation of the shaft 51 to rotate the cams 52, 53, 54 and 55 to operate the blade contacts 56, 57, 58 and 59 to and away from the stationary contacts 60, 61, 62, 63 and 64.

In both Figures 7 and 9, an axial movement of the timer shaft closes the contacts 70 and 71 which are master controls of the apparatus and which contacts are operated by axial movement of the respective knobs 72 and 73.

The washing machine and driving mechanisms may be as indicated in the patents to Kendall Clark, No. 2,422,395, granted June 17, 1947, and No. 2,366,236, granted January 2, 1945. The timer may be of the character indicated in the patent to K. O. Sisson, No. 2,520,695, granted August 29, 1950.

In Figure 9, the washing machine has a motor 75 and an agitation-spin solenoid 76, (which actually would be mounted adjacent motor 75, as in Figure 7) a hot water solenoid 77 and a cold water solenoid 78. The sequence of operations suitable for this machine are indicated in Figure 10 as will hereinafter be more fully described.

Figure 1:
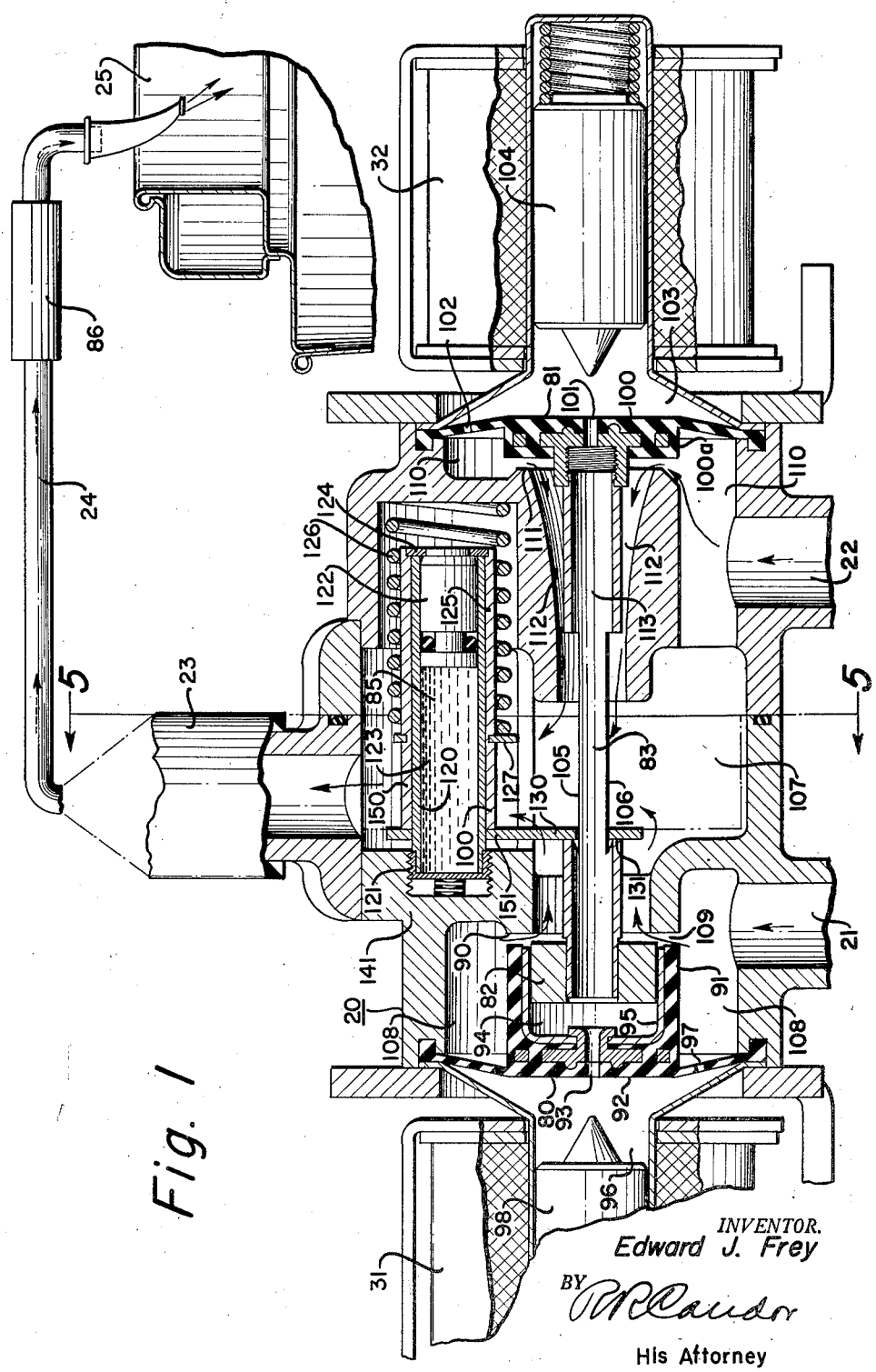
Figure 1 is a cross-section of the mixer, taken along the line 1—1 of Figure 5.

Referring now to Figures 1 to 6 inclusive, and more particularly to Figure 1, the fluid mixer has a hot fluid inlet 21, a cold fluid inlet 22 and a fluid outlet 23. A hot pilot operated valve 80 is operated by the solenoid (31 in Figure 7 or 77 in Figure 9) and the cold pilot operated valve 81 is operated by the cold solenoid (32 in Figure 7 or 78 in Figure 9). A hot fluid metering device 82 is associated with the hot pilot operated valve 80 and meters the amount of hot water fed through the mixer. A fixed connection rod or tube 83 forms an actuating connection between the metering device 82 and the cold valve 81 to govern the amount of hot water which is fed into the mixer. A thermostat 85 positively opens the metering device 82 in response to a cooling action caused when the mixture becomes too cool and has a one-way lost-motion (or permissive) connection with respect to the metering device 82 when hot water only is being fed through the mixer, to prevent reduction of hot water flow by the thermostat, as will be more fully hereinafter described.

The water passing through the mixer 20 is discharged through the pipe 24 and through a constant flow control device 86 and from thence to the tub 25. The timer opens the valve structure for definite intervals of time, to deliver measured quantities of liquid to the washing machine.

The hot pilot operated valve 80 has a valve seat 90 and a cap 91 movable to and away from the seat 90. The cap 91 is carried by a diaphragm 92 having a pilot opening or bleeder passageway 93 in communication with the tubular cavity 94, of the cap 91, which preferably is metal-lined as at 95. The pilot chamber 96 connects with the inlet 21 through a small opening 97 in the diaphragm 92, which opening is of less flow capacity than the pilot opening 93. The spring-pressed solenoid plunger 98 opens and closes the pilot opening 93 in response to the energization of the solenoid which surrounds it.

The cold pilot operated valve 81 is somewhat similar in construction and has a flexible diaphragm 100 with an extension or cap 100a. They have a pilot opening or bleeder passageway 101 of greater capacity than the opening 102 which connects the cold water inlet 22 with the pilot chamber 103. The pilot opening 101 is opened and closed by the spring pressed solenoid plunger 104 which is actuated by the solenoid 32 surrounding it.

The tube 83, which connects the diaphragm 100 with the mixing plunger 82, has a continuous passageway thereto connecting respectively with the bleeder 101 and with the tubular cavity 94. The central portion of the tube 83 is cut away at 105 and 106, to provide a fluid connection between the central part 107 of the mixing chamber with the tubular cavity 94 and the pilot chamber 103. The tube 83 is fixed to the plunger 82 and is threaded to the diaphragm 100 as shown.

The plunger 82 moves to and away from the hot water valve seat 90. It regulates the amount of hot water passing from the hot fluid inlet 21 through chamber 108, and annular passageway 109, by properly varying the size of passageway 109. The hot water passes through passageway 109 to the mixing chamber 107 and from whence it flows past the thermostat 85 to the outlet 23.

The cold water enters the inlet 22 and flows from the annular inlet chamber 110 past the cold water valve seat 111, through a high speed, relatively low pressure fluid flow passageway 112 (such as a Venturi passageway) to the central part of the mixing chamber 107 and to the outlet 23.

This construction provides means for aiding in reducing the pressure in the pilot opening 101 and also in the pilot chamber 103 sufficiently to enable the cold water pressure in chamber 110 to move the diaphragm 100 and the metering device 82 against the various pressures opposing such movement. This is accomplished by so positioning the Venturi passage 112 in proximity to the passageway 113 in the interior of tube 83 to reduce the fluid pressure in the portion 113 of the tube and in the pilot opening 101 and pilot chamber 103. Under these conditions, the cold water pressure in 110 acts against a materially reduced pressure in 103 and produces enough power to actuate the plunger 82 against any pressures that may occur at plunger 82 to oppose such movement.

The thermostat 85 is in the form of a stationary cylinder 120 threaded in 121 to the casing 141 of the mixer 20. The cylinder 120 is sealed by a slidable plunger 122 which is moved back and forth by the thermostatic substance 123 (such as described and claimed in my application for Domestic Appliance S. N. 353,065, filed May 5, 1953), against the end wall 124 of an outer cylinder 125. The cylinder 125 is pressed to the left by the spring 126, acting through the ring 127 which is secured to the outer cylinder 125.

The thermostat 85 positively opens the metering device or passageway 109 in response to a cooling action by positively moving the plunger 82 away from the valve seat 90. This is accomplished through the medium of a hinge 130 against which the outer cylinder 125 abuts. The hinge 130 in turn presses against the shoulder 131 of the tube 83. On the other hand, when hot water only is passing through the mixer, the thermostat and its outer sleeve 125 have a lost-motion with respect to the metering device, since the thermostatic structure (including cylinder 125 and hinge 131) can move to the right without necessarily imposing its movement upon the plunger 82.

When both cold and hot waters are fed through the mixer (by energizing both solenoids), the tube 83 is pulled to the right by the cold water pressure differential on diaphragm 120, and this maintains the shoulder 131 against the hinge 130. Under these conditions, the relative proportions of hot and cold waters passing the valve seats 90 and 111 is governed by the expansion and contraction of the thermostatic substance 85 substantially to maintain the selected mixed water temperature.

When hot water only is fed through the mixer (by energizing only solenoid 31), tube 83 is moved to its leftmost position by the cold water pressure acting on the right side of pilot closed diaphragm 100. The tube 83, in turn, moves the plunger 82 to its leftmost position and allows a free flow of hot water through wide open passageway 109. The hot water temperature moves the thermostat cylinder 125 to the right, but this movement is not imparted to the plunger 82 because of the lost-motion connections when hinge 130 abuts shoulder 131 and cylinder 125.

Figure 2:
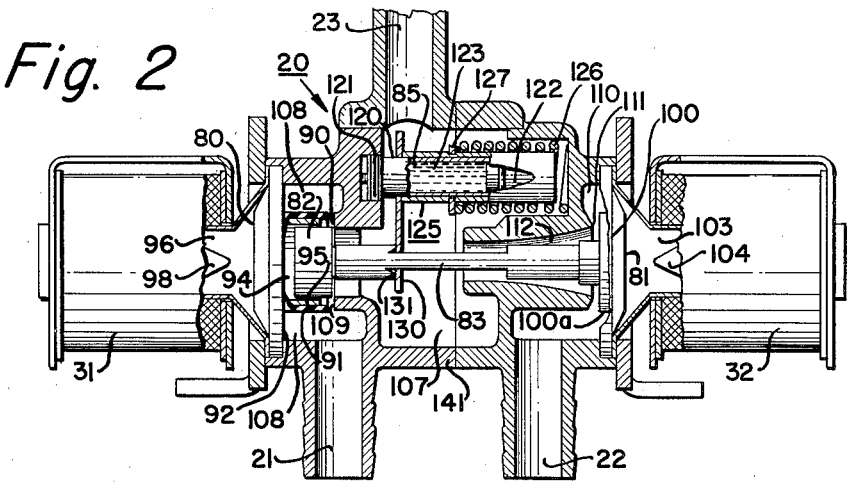
Figure 2 is a view similar to Figure 1, on a reduced scale, and showing the valve operating when the hot water is very hot.

Referring to Figure 2, solenoids 31 and 32 are energized and water which is very hot enters at 21, and cold water enters at 22. This tends to produce too warm a fluid mixture at 107. This in turn expands the thermostatic substance 123 causing a movement to the right of sleeve 125. The hinge 130, shoulder 131, tube 83 and plunger 82 follow the tube 125 to the right because the differential pressure of the cold water acting on the diaphragm 100 moves it and the rod 83 as far to the right as it is released by movement of the hinge 130 and cylinder 125. This in turn tends to reduce the size of the passageway 109 and to reduce the amount of hot water to the point where the temperature of the mixed water is substantially of the thermostatically selected temperature.

Figure 3:
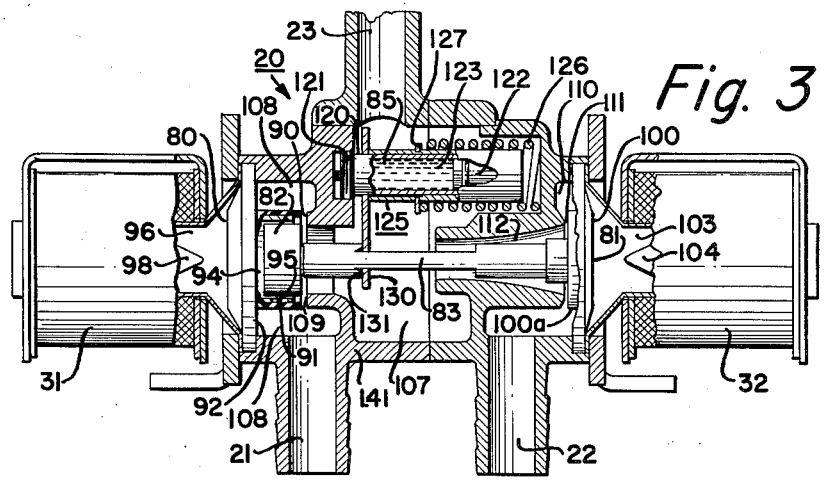
Figure 3 is a view similar to Figure 2 showing the mixer operating when the hot water is not very hot.

Referring to Figure 3, both solenoids are energized and hot water of less temperature than in Figure 2 enters at 21 and cold water enters at 22. Hence, the temperature of the mixed water at mixing chamber 107 tends to be cooler than the thermostatic setting. The thermostatic substance 123 contracts and moves the sleeve 125, hinge 130, shoulder 131 and plunger 82 to the left, thus increasing the size of passageway 109 more than in Figure 2 to increase the amount of hot water being fed through the mixer. This tends to restore or maintain the temperature of the mixed water substantially at the thermostatically selected temperature.

Figure 4:
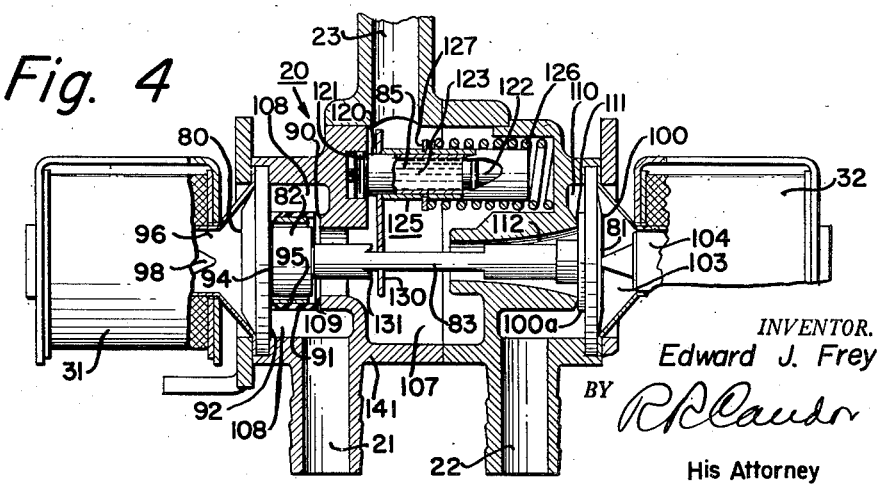
Figure 4 is a view similar to Figure 2 showing the mixer operating to allow hot water only to pass through the structure.

Referring to Figure 4, solenoid 31 only is energized and hot water only is fed at 21. The cold water valve remains closed. This causes the diaphragm 100 to remain at the extreme left, thus maintaining the tube 83 and plunger 82 likewise at the extreme left. The passageway 109 is opened to its fullest extent and allows hot water only to pass freely into the mixing chamber 107. Under these conditions, the thermostatic substance 123 tends to expand beyond the normal thermostatic setting and tends to move the sleeve 125 to the right. However, since the hinge 130 and shoulder 131 form a lost-motion connection under these conditions, and the thermostatic substance can expand as far as necessary without disturbing the action of plunger 82. It is to be noted that likewise there is no force exerted towards the right on the diaphragm 100 and hence there is no thermostatic force tending to open this valve.

The metering device 82 has a relatively slight push-pull action along the axis of rod 83 because of the substantially balanced pressure conditions adjacent to it. The diaphragm 100 has a relatively strong push-pull action because of the pressure differentials on both sides of it. The diaphragm 100 can move the mixing device 82 freely and is limited only by the position of the thermostatic abutment or hinge 130. When diaphragm 100 is fully closed, metering device 82 is fully open and is not affected by the thermostat.

Details of the thermostat and hinge construction are shown in Figures 5, 6 and 6a. The hinge 131 rocks about a pin 140 which is carried by the mixer casing 141. The hinge 131 is provided with a notch 142 which allows it to surround the outer cylinder 125 of the thermostat 85. The hinge 131 is also provided with a notch 143 through which the reduced portion of the tube 83 passes. The outer "cylinder" 125 is a continuous cylinder 125a (Figures 6 and 6a) towards one end. At the other end, it has portions thereof cut-away to form prongs 150 having tapered ends 151 which bear against the side of the hinge 131.

The mixer may be used to supply water or other fluids either in a thermostatically controlled mixed fluid, or to supply a single fluid without mixture of the other fluid. In this particular instance, the mixer is used to supply mixed water, or hot water alone to a washing machine.

The constant discharge pressure device 86 tends to prevent an extreme pressure drop in the mixing chamber 107. This relatively high pressure "backs up" tending to maintain a relatively high pressure in annular chamber 110 and on the left side of the diaphragm 100. The relatively low pressure at the throat of Venturi 112 "backs up" through passage 113 and pilot opening 101 to produce a relatively low pressure in chamber 103 and on the right side of diaphragm 100. This insures a large differential of pressures acting on diaphragm 100 and aids in maintaining the plunger 82 at the correct position regardless of any counter-pressures which might occur there.

In the operation of the structure shown in Figures 7 and 8, the timer knob 72 is turned to the start position and pushed in. This closes the contacts 70 and energizes the hot solenoid 31 and timer motor 31a. This introduces hot water to the 4th minute. At this time, the washer motor 29 is energized, without energizing the solenoid 30. This produces agitation, as described in Clark 2,422,395, to the 14th minute, at which time the spin solenoid 30 (62 of Clark 2,422,395) is energized causing a spining operation to the 15½ minute. After a half-minute pause, the hot and cold solenoids 31 and 32 are energized to feed mixed hot and cold water to the 20th minute, at which time the washing machine motor is energized to produce agitation to the 21½ minute, at which time the spin solenoid 30 is energized to produce a spinning operation to the 23rd minute. After a half-minute pause, both the hot and cold solenoids are energized to feed mixed water to the 27½ minute when the washing machine motor 29 is energized to the 29th minute to produce agitation. At this time, the spin solenoid 30 is energized to produce a spin operation to the 32nd minute.

In the first four minutes of operation only hot water is to be fed into the washing machine unless the tepid selector switch 160 of Figures 7 and 9 is moved to its upper position. When switch 160 of Figure 7 is moved to its upper position, both solenoids 31 and 32 are energized during the first four minutes when movable contact 37 moves against contact 41. Accordingly, cold water is also fed, as indicated in dotted line in Figure 8. The same is true concerning the corresponding members in Figures 9 and 10. If only hot water is to be fed during the first four minutes, by moving switch 160 to its lower position, to energize only solenoid 31, the hot water can pass through the mixer as shown and heretofore described with respect to Figure 4 without the necessity of providing a separate by-pass and without disturbing or straining the thermostatic action resulting from the hot water overheating the thermostat.

Referring to Figures 9 and 10, the action is substantially the same as with respect to Figures 7 and 9 with the exception that a combined filling operation and agitation operation occurs between the 14th and 15½ minutes and a similar combined agitation and filling operation occurs between the 21st and 23½ minute. Also, there is only one rinse operation instead of two, but otherwise the action is substantially the same.

While the form of embodiment of the invention as herein disclosed constitutes a preferred form, it is to be understood that other forms might be adopted as may come within the scope of the claims which follow.

What is claimed is as follows:

1. A fluid mixer having a hot fluid inlet, a cold fluid inlet, a fluid outlet receiving and discharging all of the fluid entering said inlets, a hot fluid pilot operated valve, a cold fluid pilot operated valve, a hot fluid metering device associated with the hot fluid pilot operated valve, a fixed connection between said metering device and said cold fluid pilot operated valve, and a thermostat construction between said inlets and outlet opening said metering device in response to a cooling action when both pilot valves are open and having a lost motion with respect to said metering device in response to a heating action when said cold fluid pilot operated valve is closed and said hot fluid pilot operated valve is open.

2. A fluid mixer having a hot fluid inlet, a cold fluid inlet, a fluid outlet receiving and discharging all of the fluid entering said inlets, a hot fluid pilot operated valve, a cold fluid pilot operated valve, a hot fluid metering device, an actuating connection between said metering device and said cold fluid pilot valve, and a thermostat construction between said inlets and outlet opening said metering device in response to a cooling action and having a lost motion with respect to said metering device in response to a heating action when said cold fluid pilot operated valve is closed and said hot fluid pilot operated valve is open.

3. A fluid mixer having a first fluid inlet, a second fluid inlet, a fluid outlet receiving and discharging all of the fluid entering said inlets, a first pilot operated valve, a second pilot operated valve, a metering device for fluid passing through said first fluid inlet, an actuating connection of fixed length between said metering device and said second fluid operated valve, a thermostat construction between said inlets and outlet opening said metering device in response to an abnormal temperature produced by fluid entering said second fluid inlet when both pilot valves are open and having a lost motion with respect to said metering device when said second valve is closed and said first valve is open.

4. A fluid mixer having a hot fluid inlet, a cold fluid inlet, a fluid outlet receiving and discharging all of the fluid entering said inlets, a hot fluid pilot operated valve, a cold fluid pilot operated valve, a hot fluid metering device between said hot fluid operated valve and said outlet, a closing connection between said metering device and said cold fluid pilot operated valve, a thermostat construction between said inlets and outlet opening said metering device by engagement with said connection in response to a cooling action and having a lost motion with respect to said connection in response to a heating action.

5. A fluid mixer having a hot fluid inlet, a cold fluid inlet, a fluid outlet receiving and discharging all of the fluid entering said inlets, a hot fluid pilot operated valve, a cold fluid pilot operated value having a diaphragm, said hot fluid pilot operated valve having a pilot opening communicating with a tubular cavity, a metering plug in said cavity, a rod secured to said plug for controlling the position of said plug and connected to the diaphragm of said cold pilot operated valve.

6. A fluid mixer having a hot fluid inlet, a cold fluid inlet, a fluid outlet receiving and discharging all of the fluid entering said inlets, a hot fluid pilot operated valve, a cold fluid pilot operated valve, said hot fluid pilot operated valve having a pilot opening discharging into a tubular cavity connected with said fluid outlet, a metering plug in said cavity, a fixed connection secured to said plug and to said cold fluid pilot operated valve for controlling the position of said plug, a thermostat construction between said inlets and outlet moving said plug to increase the flow of hot fluid in response to a cooling action upon said thermostat construction and having a lost motion with respect to said plug in response to a heating action upon said thermostat construction.

7. A fluid mixer having a hot fluid pilot operated diaphragm valve with a fluid flow extension, a cold fluid pilot operated valve having a cold fluid pressure operated diaphragm, a hot fluid metering device within said extension, a fixed connection secured to said metering device and to said cold fluid pressure operated diaphragm, a thermostat construction moving said metering device to increase the flow of hot fluid in response to a cooling action upon said thermostat construction and having a lost motion with respect to said metering device in response to a heating action upon said thermostat construction.

8. A fluid mixer having a hot fluid pilot operated diaphragm valve with a fluid flow extension, a cold fluid pilot operated valve having a cold fluid pressure operated diaphragm, a hot fluid metering device within said extension, a fixed connection secured to said metering device and to said cold fluid pressure operated diaphragm, a thermostat construction moving said metering device to increase the flow of hot fluid in response to a cooling action upon said thermostat construction and having a lost motion with respect to said metering device in response to a heating action upon said thermostat construction, said cold fluid pilot operated diaphragm valve reducing the flow capacity of said metering device in response to an opening action of said last named valve.

9. A fluid mixer having a hot fluid pilot operated diaphragm valve with a fluid flow extension, a cold fluid pilot operated valve having a cold fluid pressure operated diaphragm, a hot fluid metering device controlling the quantity of fluid flow through said hot fluid pilot operated diaphragm valve, a fixed connection secured to said metering device and to said cold fluid valve, a thermostat construction moving said metering device to increase the flow of hot fluid in response to a cooling action upon said thermostat construction and having a lost motion with respect to said metering device in response to a heating action upon said thermostat construction, said cold fluid pilot operated diaphragm valve tending to reduce the flow capacity of said metering device in response to an opening action of said last named valve.

10. A fluid mixer having a hot fluid inlet, a cold fluid inlet, a fluid outlet receiving and discharging all of the fluid entering said inlets, a hot fluid valve, a cold fluid pilot solenoid operated valve having a pilot chamber and a valve seat and a movable closing and opening diaphragm subjected on one side to outlet pressure and on the other to pilot chamber pressure and having a pilot opening opened and closed by the solenoid, a hot fluid metering device, an actuating connection between said metering device and said diaphragm, a high speed relatively low pressure fluid flow passageway between said solenoid operated valve and said outlet, and a fluid pressure connection from said pilot opening to said fluid flow passageway to impart a low pressure to said pilot chamber.

11. A fluid flow mixer having a fluid outlet, a hot fluid inlet, a cold fluid inlet discharging into a mixing chamber and to said fluid outlet, a hot fluid valve opening and closing fluid flow from said hot fluid inlet, a cold fluid pilot solenoid operated valve having a pilot chamber and controlling the flow of cold fluid from said cold fluid inlet and having a valve seat discharging to said mixing chamber, a movable closing diaphragm for said seat subjected at the central portion of one side of said diaphragm to valve seat pressure and on the peripheral portion of said side of said diaphragm to fluid pressure from said cold fluid inlet, said diaphragm being subjected on the other side to pressure in said pilot chamber maintained by a small capacity opening in said peripheral portion, said diaphragm having a pilot opening of larger capacity than said small capacity opening and connected to said pilot chamber and opened and closed by the solenoid, a hot fluid metering device regulating the quantity of flow of hot fluid from said hot fluid inlet to said mixing chamber, and an actuating connection between said diaphragm and said hot fluid metering device tending to close said metering device upon the opening of said diaphragm.

References Cited in the file of this patent

UNITED STATES PATENTS

| | | |
|---|---|---|
| 1,939,970 | Fuess | Dec. 19, 1933 |
| 2,193,581 | Clokey | Mar. 12, 1940 |
| 2,251,441 | Dillman | Aug. 5, 1941 |
| 2,308,165 | Fields | Jan. 12, 1943 |
| 2,366,236 | Clark | Jan. 2, 1945 |